(12) United States Patent
Døssing Andreasen et al.

(10) Patent No.: US 11,500,120 B2
(45) Date of Patent: Nov. 15, 2022

(54) SENSOR SYSTEM WITH AN ATTACHMENT ELEMENT FOR A MANNED OR UNMANNED AIRCRAFT

(71) Applicant: Danmarks Tekniske Universitet, Kgs. Lyngby (DK)

(72) Inventors: Arne Døssing Andreasen, Værløse (DK); Jakob Jakobsen, København Ø (DK)

(73) Assignee: DANMARKS TEKNISKE UNIVERSITET

( * ) Notice: Subject to any disclaimer, the term of this patent is extended or adjusted under 35 U.S.C. 154(b) by 920 days.

(21) Appl. No.: 16/323,305

(22) PCT Filed: Jul. 19, 2017

(86) PCT No.: PCT/EP2017/068246
§ 371 (c)(1),
(2) Date: Feb. 5, 2019

(87) PCT Pub. No.: WO2018/028956
PCT Pub. Date: Feb. 15, 2018

(65) Prior Publication Data
US 2021/0033745 A1    Feb. 4, 2021

(30) Foreign Application Priority Data

Aug. 12, 2016   (EP) .................................... 16184009

(51) Int. Cl.
*B64C 39/02*    (2006.01)
*B64D 3/02*     (2006.01)
*G01V 3/16*     (2006.01)
*G01V 3/165*    (2006.01)

(52) U.S. Cl.
CPC .............. *G01V 3/16* (2013.01); *B64C 39/022* (2013.01); *B64C 39/024* (2013.01); *B64D 3/02* (2013.01); *G01V 3/165* (2013.01); *B64C 2201/12* (2013.01); *B64C 2201/146* (2013.01); *B64C 2201/206* (2013.01)

(58) Field of Classification Search
CPC ........ G01V 3/16; G01V 3/165; B64C 39/022; B64D 3/02
See application file for complete search history.

(56) References Cited

U.S. PATENT DOCUMENTS

| | | | |
|---|---|---|---|
| 2,955,251 | A | 10/1960 | LaMotte Shaw et al. |
| 5,188,313 | A | 2/1993 | Piasecki |
| 6,244,534 | B1 | 6/2001 | Klinkert |

(Continued)

FOREIGN PATENT DOCUMENTS

| | | |
|---|---|---|
| GB | 2098946 A | 12/1982 |
| WO | 9932905 A1 | 7/1999 |

(Continued)

OTHER PUBLICATIONS

Aerobotic Geophysical Systems: "Airborne Robots for Exploration Geoscience—Magnetometry & Radio EM".

(Continued)

*Primary Examiner* — Minh Q Phan
(74) *Attorney, Agent, or Firm* — Dinsmore & Shohl LLP

(57) ABSTRACT

The present disclosure relates to a remote sensing system, comprising: an air towable housing for carrying one or more sensors, the air towable housing and/or a comprising at least a first pulley.

23 Claims, 19 Drawing Sheets

(56) References Cited

U.S. PATENT DOCUMENTS

| | | |
|---|---|---|
| 6,845,936 B1 | 1/2005 | Mouge et al. |
| 9,205,922 B1 | 12/2015 | Bouwer |
| 2013/0062464 A1 | 3/2013 | Speer |
| 2014/0361939 A1 | 12/2014 | Duncan et al. |
| 2015/0034795 A1 | 2/2015 | Polzer |
| 2015/0048834 A1 | 2/2015 | Allen |

FOREIGN PATENT DOCUMENTS

| | | | |
|---|---|---|---|
| WO | 2005106536 A1 | 11/2005 | |
| WO | 2014075609 A1 | 5/2014 | |
| WO | 2015127939 A1 | 9/2015 | |
| WO | WO-2015173642 A1 * | 11/2015 | ............... G01R 1/14 |

OTHER PUBLICATIONS

Legault: "Airborne electromagnetic systems—state of the art and future directions" in CSEG Recorder, Jun. 2015, Geotech Ltd., Aurora, Ontario.

* cited by examiner

SENSOR SYSTEM WITH AN ATTACHMENT ELEMENT FOR A MANNED OR UNMANNED AIRCRAFT

FIELD OF INVENTION

The present invention relates to a remote sensing system, in particular an air towable housing configured for being connected to a manned or unmanned aircraft such that the air towable housing is stabilized relative to the aircraft, more particular such the air towable housing is separated from the aircraft by a distance relative to the aircraft such that the air towable housing is restricted from moving at least sideways relative to the aircraft.

BACKGROUND OF INVENTION

High-quality geomagnetic surveys are traditionally performed by using a so-called "bird"; an elongated, non-magnetic container, which houses magnetic sensor(s) and is typically towed >20 meters below a helicopter in order to magnetically isolate the sensor(s) from the magnetic disturbance of the helicopter, in particular from the engines. The bird also normally houses magnetic sensor electronics, batteries, as well as various positional instruments (global positioning system (GPS), altimeter, and inclinometer) to precisely determine the position and attitude of the bird.

Thus, positional stability of the bird is typically not crucial in normal geomagnetic surveys, because the positional instruments in the bird itself continuously monitor its position and/or attitude during the survey. Typically, the bird is therefore allowed to sway from side to side.

Nevetheless, there may be some situations, where swaying can influence on the survey. An example of such a situation may be when the bird is supposed to follow a path back and forth. The aircraft towing the bird may easily follow the path back and forth, but the bird may sway from side to side. In such a case, the bird may overlap at specific points on interest on the path, and this may cause some severe survey problems. Consequently, the scanned area may not be scanned optimally, and several errors may be caused by swaying of the bird.

The traditional bird is designed to be towed in one long string and is typically shaped as a torpedo; a shape which:
- controls its directional and attitude stability, i.e. movements around the roll axis, the pitch axis and the yaw axis
- is necessary in order to magnetically isolate the magnetic sensor(s) from all the other instruments and batteries in the bird by at least 3 meters.

Hence, the traditional bird is typically rather large and heavy and is not possible to carry by a small- to medium sized unmanned aircraft. In addition, the >20 meters long, one-string attachment system facilitates uncontrollable swaying of the bird during accelerations/decelerations of the helicopter or during wind gusts. This makes it difficult to safely maneuver with the bird close to ground in steep terrain areas.

WO 99/32905 discloses a bird that is able to be towed by one cable, only. The bird is formed as a torpedo that provides for directional stability of the bird. Positional stability of the bird relative to the unmanned aircraft along the yaw axis, only, i.e. up and downwards, is provided by means of the airspeed of the unmanned aircraft and the properties of the cable. No positional stability of the bird along the roll and pitch axis is provided. The unmanned aircraft as disclosed in WO 99/32905 is connected to a manned aircraft by a tow-rope arrangement, whereby the unmanned aircraft is limited in upwards and downwards pitch relative to the manned aircraft. However, the unmanned aircraft is free to move around the roll axis and the yaw axis relative to the second aircraft. Further, the unmanned aircraft is also free to move along the pitch axis, the roll axis and the yaw axis relative to the second aircraft.

A sensor system with a bird with directional stability is provided in WO 2005/106536. In WO 2005/106536 a plurality of tow-ropes are connected to the bird from a transmitting coil and the transmitting coil is further connected to a manned aircraft carrying the transmitting coil. The sensor system as disclosed in WO 2005/106536 is relatively complex and not particularly lightweight since it comprises two structures, the transmitting coil and the bird, to be towed by the aircraft. Furthermore, the bird as disclosed in 2005/106536 is free to move along the pitch axis relative to the manned aircraft, i.e. free to move from side to side.

Both WO 99/32905 and 2005/106536 provides no restrictions in the movement of the bird from side to side, i.e. along the pitch axis.

A system that provides for remote sensing with limited swaying is therefore needed.

Typically, restrictions on the bird's position relative to the aircraft are not required. As previously described, the bird is thus typically free to move from side to side relative to the aircraft, simply because the position and attitude of the bird are to be determined by a GPS, altimeter and inclinometer housed in the bird.

One problem by using a bird housing a GPS is its heavy weight compared to the aircraft towing the bird and its rather large size, which is needed to magnetically isolate the magnetic sensor(s) from the GPS and other instruments. Accordingly, the aircraft towing the bird uses a lot of energy on towing the bird. Also, the large size of the bird makes it more difficult to control the aircraft. If the energy source on the aircraft towing the bird is limited to a battery, the range of the geomagnetic survey is limited to a small range.

Thus, there is also a need for system that provides for remote sensing without using a lot of energy on towing the bird.

SUMMARY OF INVENTION

The present disclosure relates to a sensor system comprising a bird having positional stability below an aircraft. The present disclosure provides a remote sensing system, comprising: an air towable housing configured for carrying one or more sensors; an aircraft configured for towing the air towable housing; an attachment element connecting the air towable housing to the aircraft via at least one pulley, such that the attachment element being attached in a suspension having at least three attachment places: a first place of the housing, a first place of the aircraft, and a second place of the aircraft, wherein the at least one pulley is attached to at least one of the at least three attachment places.

In a preferred embodiment, the suspension by the at least three attachment places may connect the air towable housing to the aircraft, such that sideways movement of the air towable housing relative to the aircraft enforces rotation of the at least one pulley. Friction within the pulley(s) will then dampen the sideways movement, thereby restricting the sideways movement of the air towable housing relative to the aircraft.

Accordingly, a length of the attachment element may change on each side of the at least one pulley, thus enforcing work on the pulley(s). It is the work that introduces force to the pulley, whereby the sideways movement is damped.

According to the present invention, the attachment element is connected at minimum two places of the aircraft, preferably two different places. The attachment element is further connected to the air towable housing at one place. There is at least one pulley at one of the three places. Angular spin of the pulley is induced by the attachment element. For example, the attachment element may be a string, thus inducing a string force to the pulley.

Accordingly, it is to be understood, when the attachment element connects via the pulley, i.e. to either the aircraft and/or the air towable housing, the attachment element connects through the pulley. The connection of the attachment element through the pulley is preferably directly. In other words, in preferred embodiments, the attachment element is a single attachment element, such as a rope, a string or a cable, connecting the air craft to the air towable housing through the at least one pulley, the at least one pulley attached to one of the three attachment places.

In some embodiments, the length of the attachment element is kept constant. When the length of the attachment element changes on each side of the at least one pulley during sideway movements, and the length of the attachment element is kept constant, the sideways movement may in some embodiments be limited to an ellipsoid trajectory. For example, by having only two attachment points at the aircraft, an ellipsoid trajectory of the air towable housing is provided during swaying. This follows by definition, since an ellipsoid trajectory is a curve in a plane surrounding two focal points (the two attachment places on the aircraft) such that the sum of the distances to the two focal points is constant for every point on the curve. Accordingly, swaying is accommodated by angular spin of the pulley(s), which then due to friction dampens the swaying by resistance to angular spin.

The invention thus provides a remote sensing system where swaying of the bird is limited. Accordingly, the invention thus provides optimized sensing of for example an area, such as during a geomagnetic survey.

In relation to what is known from geomagnetic surveys, the air towable housing according to the present invention may be referred to as the bird. The one or more sensor(s) may be magnetic sensor(s) configured to measure geomagnetic fields. In other words, the sensor(s) may be configured to receive signals. In some embodiments, the magnetic sensor(s) may be magnetometers.

The prior art as described in the background of the invention makes it clear that in geomagnetic surveys, it is common to connect a bird housing a GPS, an altimeter and an inclinometer directly to the aircraft on a single point of the aircraft via one tow rope, only. Due to the GPS, altimeter and inclinometer being housed in the bird, positional stabilization of the bird relative to the aircraft is not typically required. On the other hand, directional stabilization of the bird has been the issue due to a transceiver unit had to be fixed relative to the receiver unit housed in the bird.

The present invention differs from the system disclosed in WO 99/32905 and WO 2005/106536 by having the attachment element from the bird attached to at least two parts or places of the aircraft via at least a first pulley, wherein the at least first pulley is connected to the air towable housing and/or to the aircraft. The two parts or places may be two points of the aircraft. In one embodiment, the two points or places of the aircraft are two separate points. By the arrangement as just described, the present invention provides that the position of the air towable housing is restricted from moving at least sideways relative to the aircraft. This restricted movement also differs from WO 99/32905 and WO 2005/106536.

By restricting the movement of the bird at least from side to side, the present invention provides increased stability when towing a bird.

In some embodiments, the remote sensing system is configured for acquiring a position and attitude of the aircraft towing the air towable housing. In other embodiments, the remote sensing system is configured for determining the position of the air towable housing relative to the aircraft. However, in a further embodiment, the remote sensing system is configured for acquiring the position and attitude of the air towable housing.

Thus, in some embodiments, the present disclosure provides a remote sensing system, comprising: an air towable housing for carrying one or more sensor(s), the air towable housing and/or an aircraft towing the air towable housing comprising at least a first pulley, wherein the system is configured for acquiring the position and attitude of an aircraft towing the air towable housing, and wherein the system is configured for determining the position of the air towable housing relative to the aircraft, and an attachment element configured for being attached to the air towable housing and to at least a first part of the aircraft and a second part of the aircraft via at least the first pulley, such that the air towable housing is restricted from moving at least sideways relative to the aircraft.

In this embodiment, it may be possible to tow an air towable housing without a GPS. Without a GPS, the air towable housing may be very short, since no shielding of the GPS is required. Accordingly, without a GPS, the air towable housing or the bird may be made lightweight. This embodiment may enable an aircraft being air-born for a longer time. In other words, the air towable housing may be non-magnetic.

In some embodiments the towable housing may according to the present invention may weigh less than 5 kg, such as less than 4 kg, such as less than 3 kg, such as less than 2 kg, or such as less than 1 kg. In some preferred embodiments, the weight of the sensing device may be less than 0.5 kg.

According to the present invention, the attachment element may in one embodiment be a single attachment element such as one string, one wire or one rope. Since this attachment element may be connected to at least two parts or places of the aircraft via at least a first pulley, there is provided means for flexible positions of the sensing device relative to the aircraft, for example by shortening the attachment element.

DETAILED DESCRIPTION OF THE INVENTION

Figure 1:
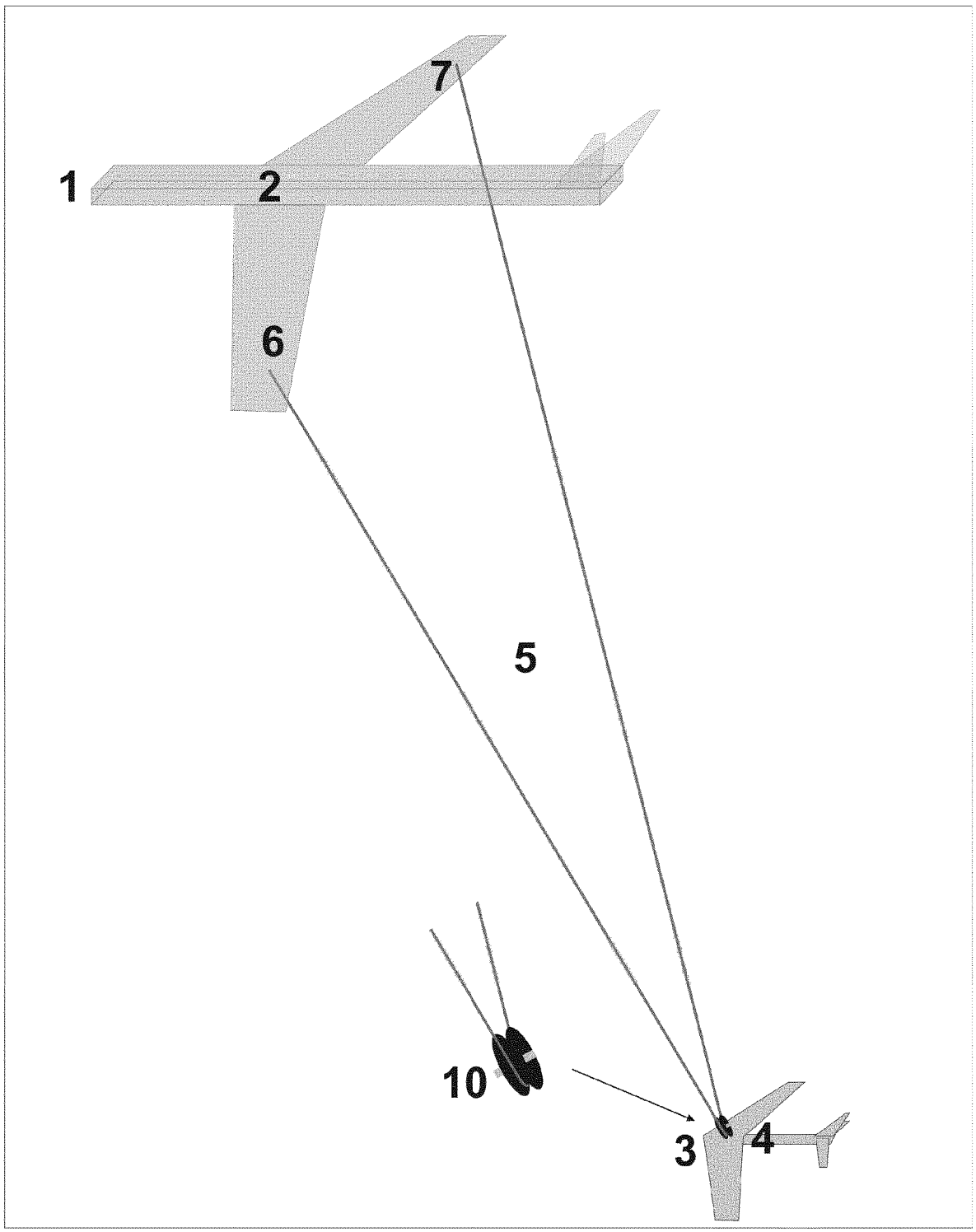
FIG. 1 shows an embodiment of the remote sensing system according to the present invention with a first pulley.

The present disclosure relates to a remote sensing system. Further details of the invention are disclosed in the following.

Positioning Unit

In one embodiment of the invention, the air towable housing is attached to the aircraft, wherein the aircraft is a manned or unmanned aircraft. The aircraft may comprise a positioning unit configured for providing a coordinate set, defining a position and/or attitude of the aircraft.

In one embodiment of the invention, the positioning unit is a global positioning system, referred to a GPS. In other embodiments, the positioning unit is a global navigation satellite system, referred to as GNSS. In other embodiments the positioning unit is a combined system including GNSS and inertial sensors, such as accelerometers, gyroscopes and magnetometers etc. The positioning unit is in some embodiments preferably configured for providing a 2D/3D position, 2D/3D velocity and time.

The Attachment Element and Pulleys

In one embodiment of the invention, the attachment element is a string. In another embodiment the attachment element is a rope. In another embodiment the attachment element is a wire. In most preferred embodiments, the attachment element is a single string, a single rope, or a single wire.

In one embodiment of the invention, a second pulley is attached to another of the at least three attachment places. Thus, in one embodiment of the invention, the attachment element is attached to a place of the aircraft via the second pulley, wherein the second pulley is configured for being connected to the aircraft.

In another embodiment, the attachment element is further attached to a third and/or fourth place of the aircraft. In an alternative embodiment of the invention, the attachment element is further connected to three or four places of the aircraft, wherein the pulley(s) is/are attached to the air towable housing and/or to the air craft. In some embodiments, a second pulley is connected to the first pulley. In relation to this embodiment, the second pulley may for example be attached perpendicular to the first pulley.

In some embodiments of the invention, a third pulley is attached to a third place of the at least three attachment places. In further embodiment of the invention, the attachment element is further connected the aircraft via a third and a fourth pulley, wherein the third and fourth pulleys are attached to the aircraft.

In preferred embodiments, an additional pulley is attached to the first pulley, and/or the second pulley and/or the third pulley.

The above arrangements with different pulleys provide for flexible positions of the air towable housing relative to the aircraft. For example, the position of the air towable housing is easily adjustable, by the above embodiments and in particular if the attachment element is a single attachment element. When the attachment element is a single attachment element going through the various pulleys, the position of the air towable housing can be adjusted by adjusting the length of the attachment element. The length of the attachment element may for example be different during take-off, landing and in-flight mode. One way to adjust the length of the attachment element, on board of the aircraft, may for example be by using a winch as will be described further below.

Further, by the some of the above arrangements where the attachment element is attached to the air towable housing by an attachment element, and attached to the aircraft at two or more fix points, the position of the air towable housing may also be restricted from moving back and forth relative to the aircraft, and/or up and down relative to the aircraft.

In some embodiments of the present invention, the system further comprises one or more additional attachment element(s) attached between the aircraft and the air towable housing. In a special embodiment of the present invention, the first pulley is connected to the air towable housing via three or more strings or ropes. This may for example provide a safety connection and/or an alternative fixation of the air towable housing relative to the aircraft.

In a preferred embodiment of the present invention, at least one place of the at least three attachment places is connected with a frequency damping device, such as a spring or an elastic element.

In a more preferred embodiment of the present invention, the first pulley is connected to the air towable housing via a frequency damping device, such as a spring or an elastic element. An advantage of the frequency damping device is to dampen high-frequency vibrations that are not cancelled by the pulley(s). One or more frequency damping device(s)

may be used, for example both on the aircraft and on the air towable housing at particular fix-points, i.e. the places as above described.

Winch

In a most preferred embodiment of the invention, one or more of the attachments to the aircraft comprise(s) a winch configured for controlling the length of the attachment element, thereby controlling a position of the air towable housing relative to the aircraft. The winch may be controlled on-ground and/or automatically. Preferably the winch is located in the tip of the aircraft.

The Aircraft

In one embodiment of the invention, the first part of the aircraft is the tip of the aircraft, a first wing of the aircraft, or a first boom extending from the aircraft. One or more booms may typically be used on a helicopter to extend the area of the aircraft, whereby the connection points are greatly separated from each other. Since the attachment element is connected to the first part or place of the aircraft and the second part or place of the aircraft, there is provided a large separation of the connection points or places by the just described embodiment. In particular, the separation from the first part or place to the second part or place, may in some embodiments be where the second part or place of the aircraft is the rear of the aircraft, a second wing of the aircraft, or a second boom extending from the aircraft.

To provide for optimal fixation of the air towable housing, a third part or place of the aircraft may be a first wing or a first boom extending from the aircraft. A fourth part or place of the aircraft may be a second wing or a second boom extending from the aircraft.

As previously described, the aircraft may comprise a frequency damping device, such as a spring or an elastic element.

Embodiments of the aircraft are a helicopter, a multirotor, a fixed wing airplane, a hybrid multirotor or a fixed wing aerial vehicle.

In a preferred embodiment of the invention, the aircraft comprises a detector configured for detecting a precise position and/or attitude of the air towable housing. For example, the detector may be an imaging detector, such as in a camera for acquiring images of the air towable housing. Alternatively, the detector may be an optical detector, configured for detecting the amplitude of the light, thereby determining the position and/or attitude of the air towable housing. In some embodiments, the aircraft comprises a light source configured for transmitting an optical signal to the air towable housing. The optical signal may be reflected from the air towable housing and back into the detector on the aircraft. The optical signal as disclosed herein may refer to electromagnetic signals with wavelengths in the ultraviolet (UV) domain, and/or the visible domain and/or the infrared (IR) domain, and/or the radio domain, for example using radar sensing.

Air Towable Housing and Data

In one embodiment of the present invention, a coordinates set, defining the position and/or the attitude of the aircraft, is linked to a position and/or attitude of the air towable housing. For example, as described in relation to the aircraft having a detector, the position and attitude of the air towable housing may be related to the aircraft by optical signal as also just described. However, in some embodiments, the linking of the position of the air towable housing may be mechanically determined, in particular because the present invention provides a fixed position of the air towable housing relative to the aircraft via the attachment element. Knowing the length of the attachment element and/or the airspeed of the aircraft and/or bird provides for a calculation of the position of the air towable housing, once the position of the aircraft is known. Typically, the distance to the air towable housing is in the range 1-100 meters, such as 5-10 meters, such as 10-70 meters, such as 20-60 meters. Accordingly the attachment element may at least have a length double the distance from the aircraft to the air towable housing as the attachment element is first connected to the aircraft, then through the pulley on the air towable housing, and then back to the aircraft.

As previously described, the air towable housing may equipped with reflecting means configured for reflecting the optical signal back to the aircraft, whereby the optical signal is detected by the detection means. In some embodiments, the reflecting means may be a corner cube, whereby an optical signal emitted from the aircraft is reflected directly back along the same path and back to the aircraft.

By using reflective means, it may be possible to use laser tracking technology on board the aircraft—this may be able to track the X, Y, Z coordinates of the mirrors on the air towable housing.

Other sensing techniques may for example be a single or two visual cameras on board the aircraft that via image processing can determine the X, Y, Z position of for example mirrors. The Z-position may be computed from the X,Y-position simply from the string system geometry and for example when all strings are stretched.

In alternative embodiments of the present invention, radar technology on board the aircraft is used to determine the X,Y,Z coordinates of the air towable housing. By using one or more of the sensing techniques from the aircraft, the position and attitude of the air towable housing relative to the coordinate frame of the aircraft can be determined. Hence, the position of the air towable housing relative to ground is able to be determined due to the position unit, such as a GNSS system (including attitude sensors), being installed within the aircraft.

In a most preferred embodiment of the invention, the air towable housing comprises an aerofoil configured for providing positive lift to the air towable housing. Thereby is provided a device with an overall low weight, in particular because the aircraft is not required to lift the air towable housing. In another embodiment of the invention, the air towable housing comprises an aerofoil configured for providing negative lift to the air towable housing. Thereby is provided a device with an overall higher weight. The lift may in some embodiments be responsible for providing stability of the air towable housing relative to the aircraft. Negative lift may also provide for the attachment element being stretched, such that for example the Z-position of the air towable housing is able to be computed easily.

According to the present invention, the remote data is geomagnetic data, image data, and/or differential data. The data may relate to minerals, unexploded ordnance (UXO), waste deposits, oil and/or gas, geothermal energy, and/or geoscientific research.

EXAMPLE 1

A Remote Sensing System with a First Pulley

FIG. 1 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6 and a second part of the aircraft 7 via the attachment element 5 composed of a single string, wire or rope and comprising a first pulley 10 attached to the air towable housing.

EXAMPLE 2

A Remote Sensing System with a First Pulley and a Second Pulley

Figure 2:
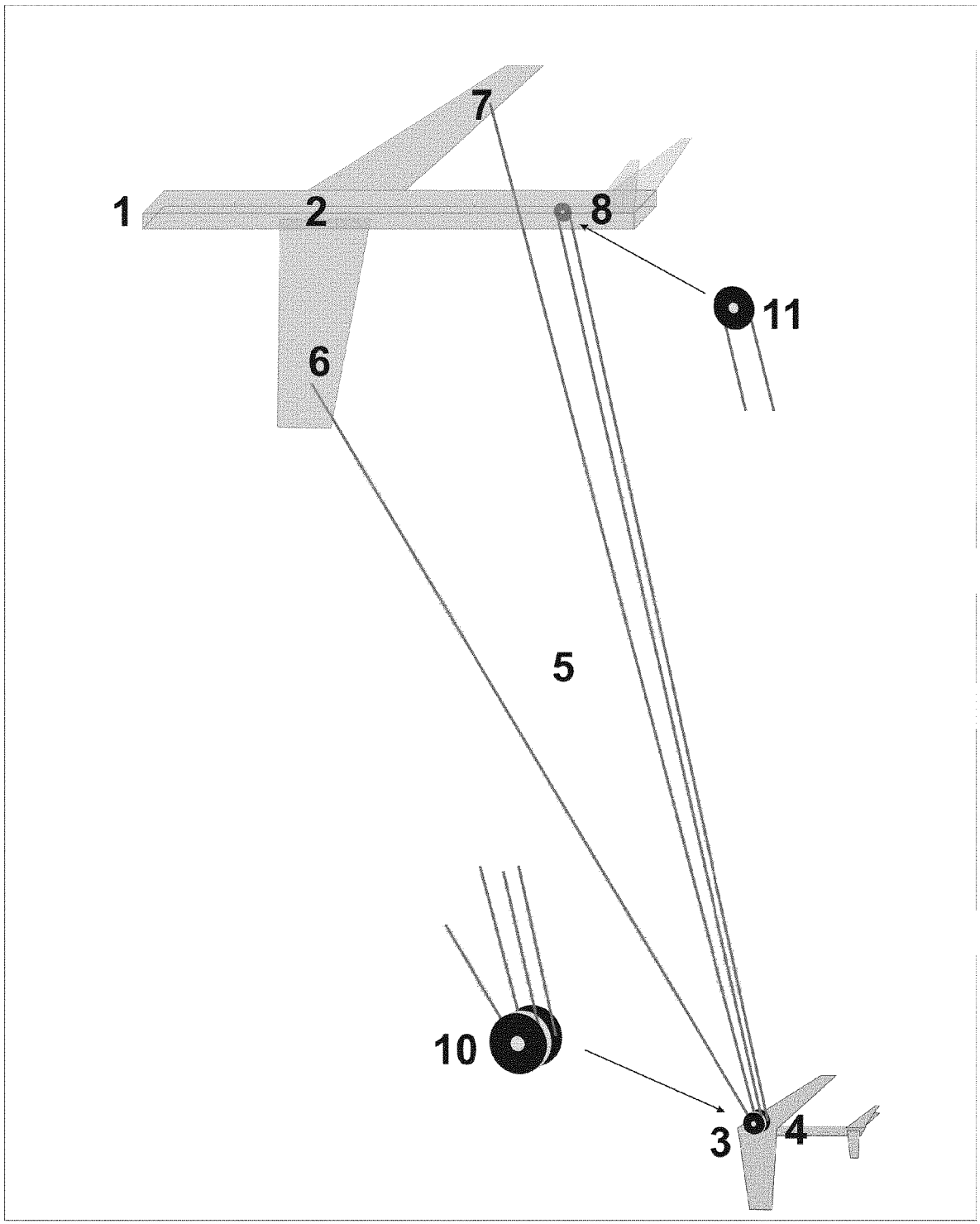
FIG. 2 shows an embodiment of the remote sensing system according to the present invention with a first and a second pulley.

FIG. 2 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7 and a third part of the aircraft 8 via the attachment element 5 composed of a single string, wire or rope and comprising a first pulley 10 attached to the air towable housing 3 and a second pulley 11 attached to the third part of the aircraft 8.

EXAMPLE 3

A Remote Sensing System with a First Pulley and a Second Pulley

Figure 3:
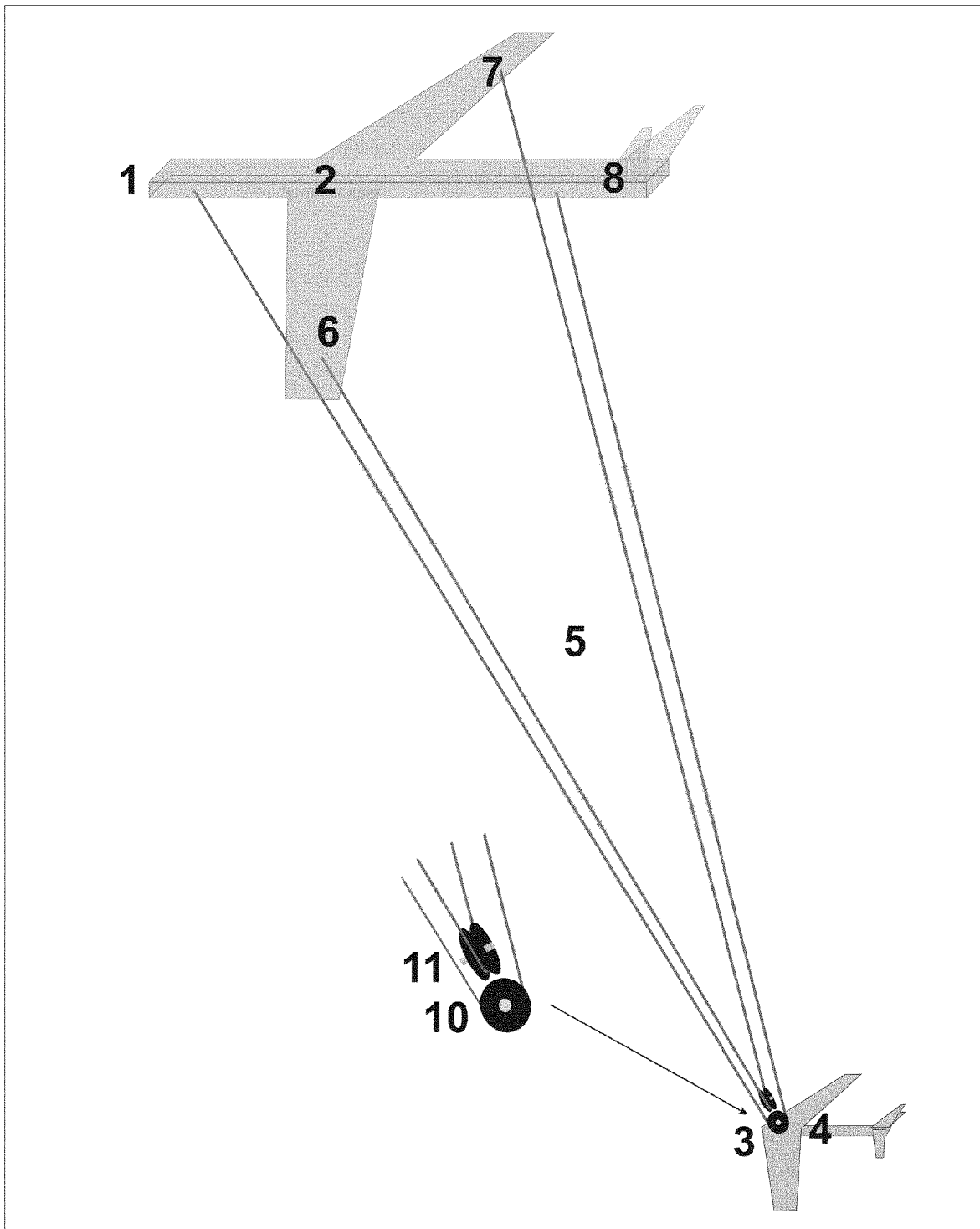
FIG. 3 shows an embodiment of the remote sensing system according to the present invention with a first and a second pulley.

FIG. 3 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7, a third part of the aircraft 8 and a fourth part of the aircraft 9 via the attachment element 5 composed of two strings, wires or ropes and comprising a first pulley 10 attached to the air towable housing 3, and a second pulley 11 attached to the first pulley 10.

EXAMPLE 4

A Remote Sensing System with Four Pulleys

Figure 4:
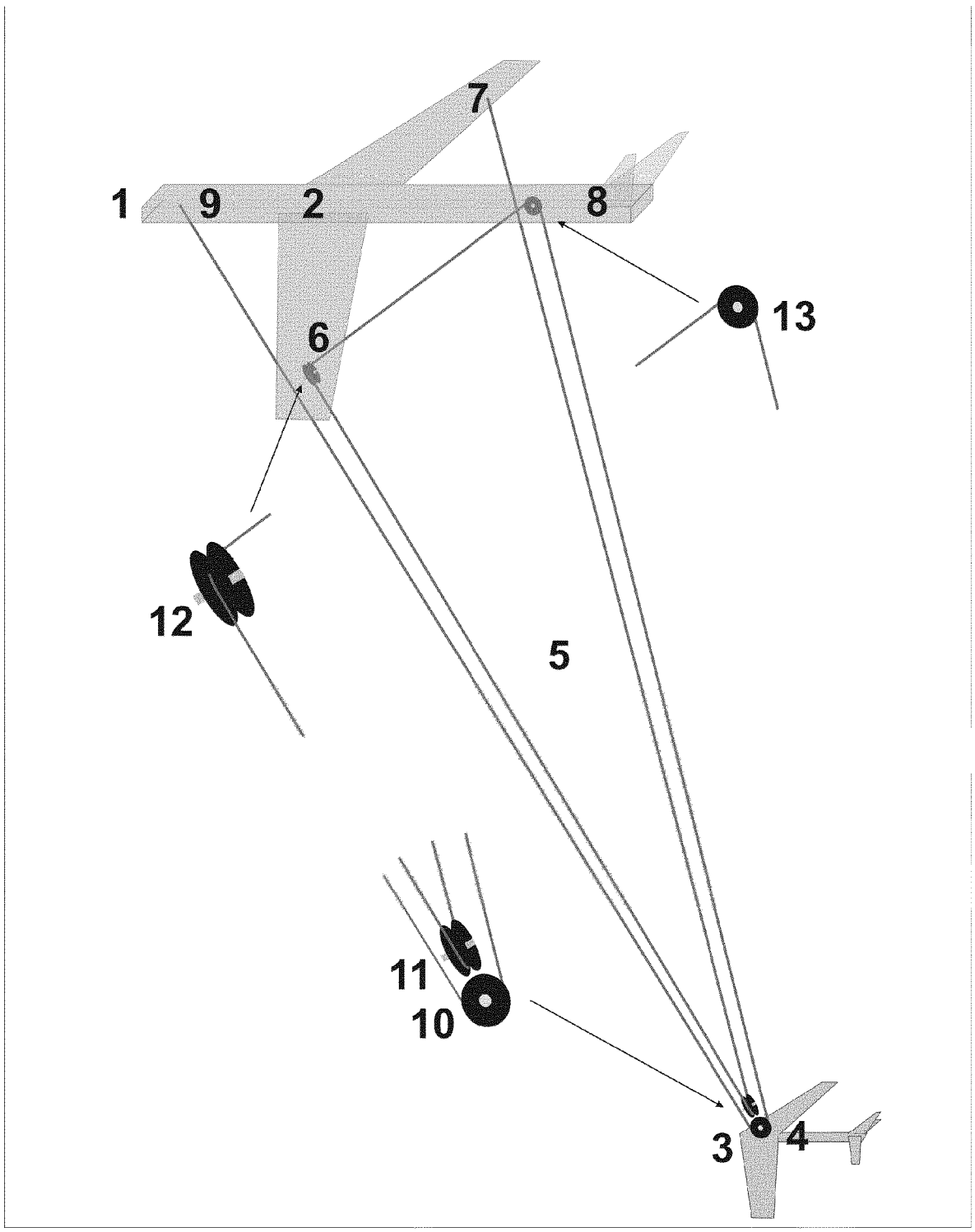
FIG. 4 shows an embodiment of the remote sensing system according to the present invention with four pulleys.

FIG. 4 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7, a third part of the aircraft 8 and a fourth part of the aircraft 9 via the attachment element 5 composed of a single string, wire or rope, and comprising a first pulley 10 attached to the air towable housing 3, a second pulley 11 attached to the first pulley 10, a third pulley 12 attached to the first part of the aircraft 6, and a fourth pulley 13 attached to the third part of the aircraft 8.

EXAMPLE 5

A Remote Sensing System with Seven Pulleys

Figure 5:
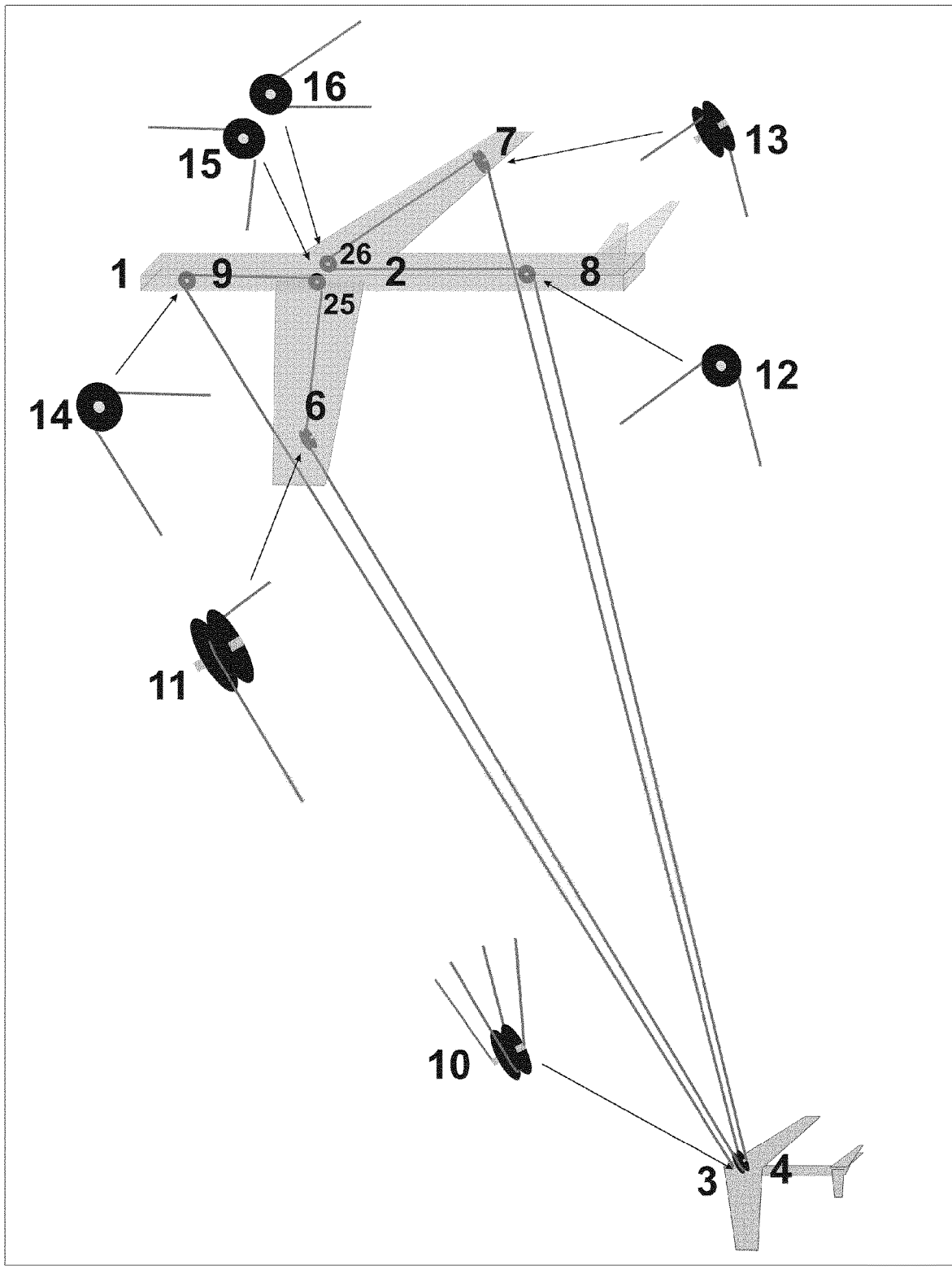
FIG. 5 shows an embodiment of the remote sensing system according to the present invention with seven pulleys.

FIG. 5 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7, a third part of the aircraft 8 and a fourth part of the aircraft 9 via the attachment element 5, composed of a single string, wire or rope and comprising a first pulley 10 attached to the air towable housing 3, a second pulley 11 attached to the first part of the aircraft 6, a third pulley 12 attached to the third part of the aircraft 8, a fourth pulley 13 attached to the second part of the aircraft 7, a fifth pulley 14 attached to the fourth part of the aircraft 9, and a sixth pulley 15 and a seventh pulley 16 attached to the fifth part of the aircraft 25 and sixth part of the aircraft 26.

EXAMPLE 6

A Remote Sensing System with Four Pulleys and a Winch

Figure 6:
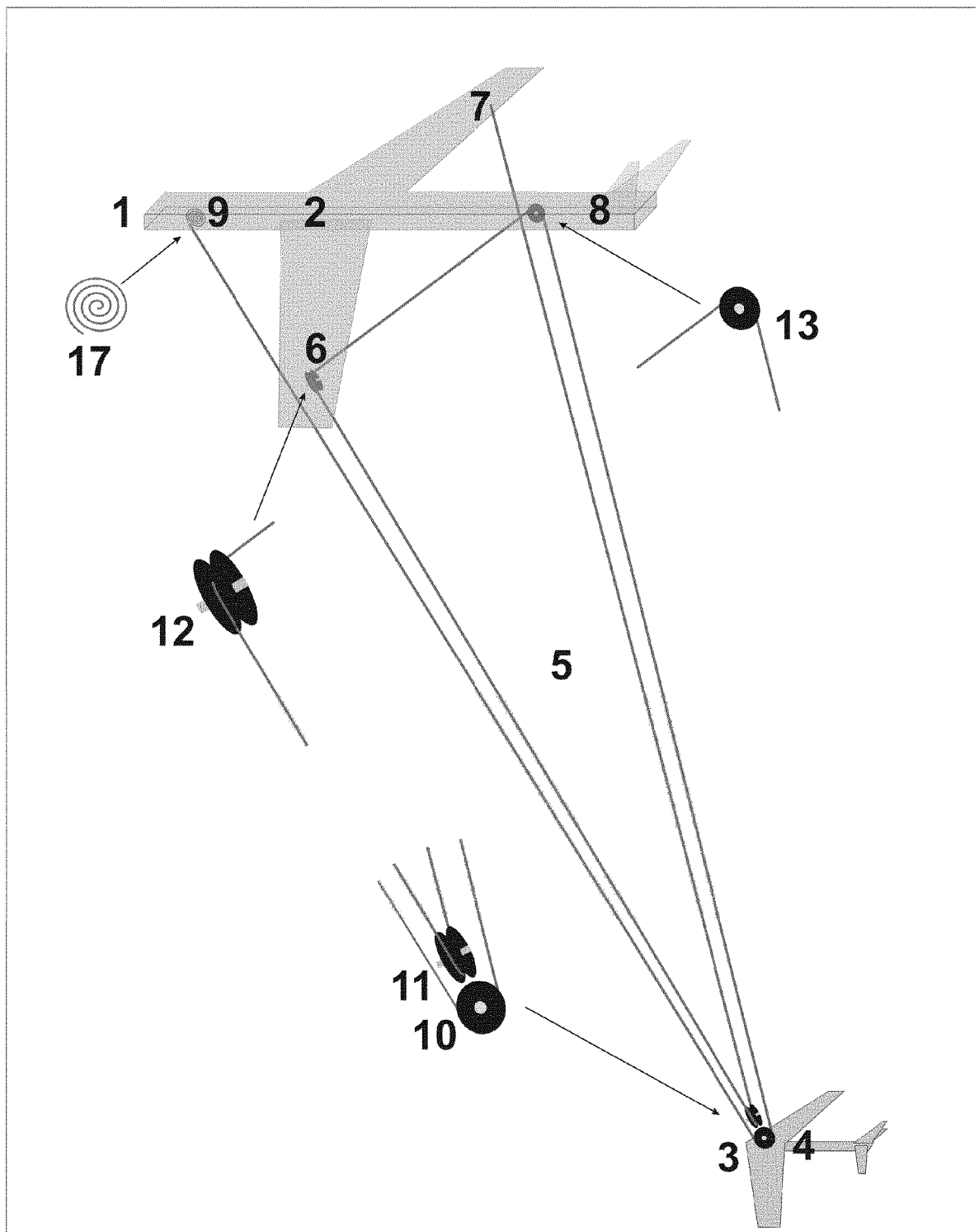
FIG. 6 shows an embodiment of the remote sensing system according to the present invention with four pulleys and a winch.

FIG. 6 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7, a third part of the aircraft 8 and a fourth part of the aircraft 9 via the attachment element 5 composed of a single string, wire or rope, and comprising a first pulley 10 attached to the air towable housing 3, a second pulley 11 attached to the first pulley 10, a third pulley 12 attached to the first part of the aircraft 6, a fourth pulley 13 attached to the third part of the aircraft 8, and a winch 17 located in the fourth part of the aircraft 9.

EXAMPLE 7

A Remote Sensing System with Four Pulleys, a Winch and Frequency Damping Unit(s)

Figure 7:
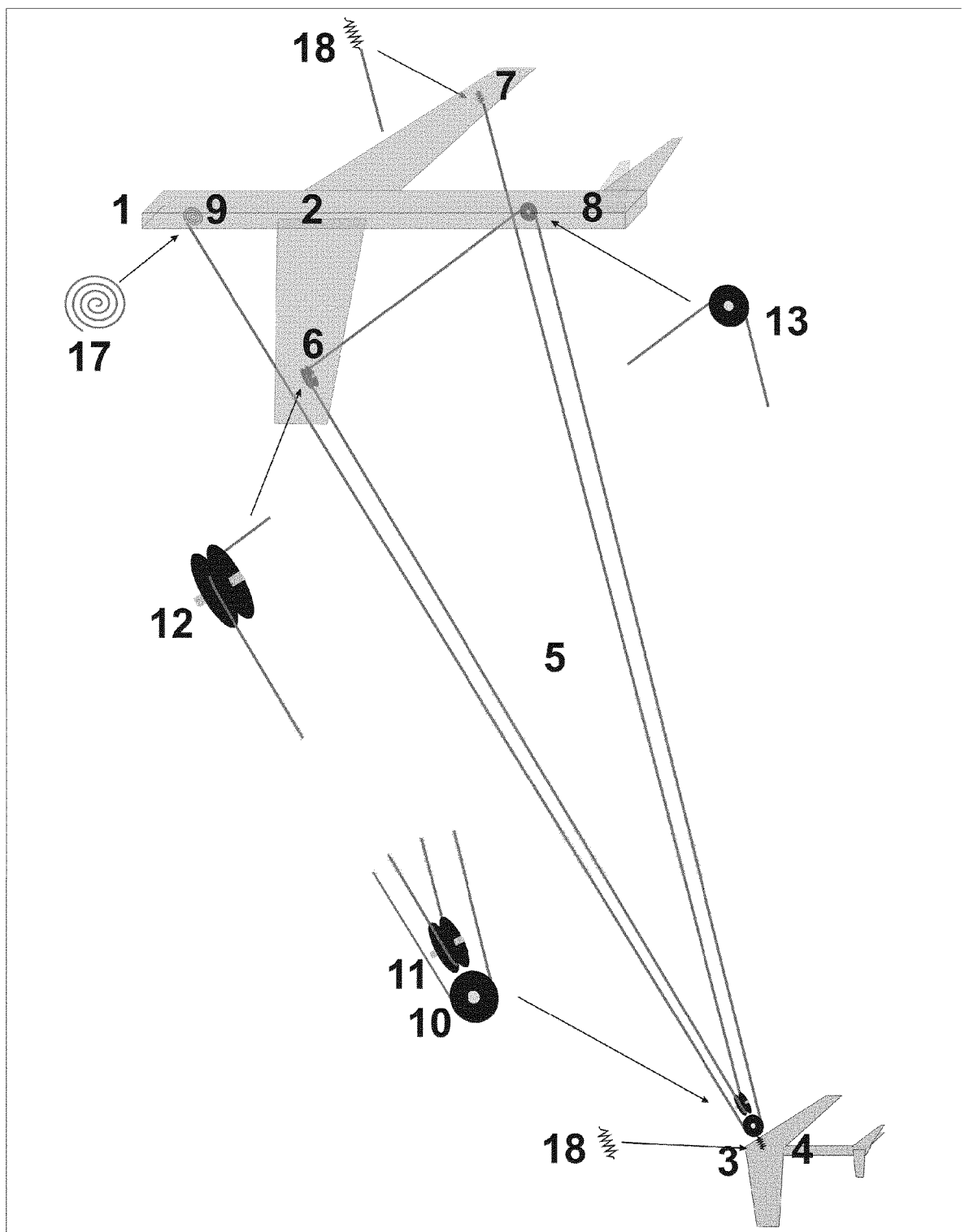
FIG. 7 shows an embodiment of the remote sensing system according to the present invention with four pulleys, a winch and frequency damping unit(s).

FIG. 7 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6, a second part of the aircraft 7, a third part of the aircraft 8 and a fourth part of the aircraft 9 via the attachment element 5 composed of a single string, wire or rope, and comprising a first pulley 10 attached to the air towable housing 3 via a frequency damping device 18, a second pulley 11 attached to the first pulley 10, a third pulley 12 attached to the first part of the aircraft 6, a fourth pulley 13 attached to the third part of the aircraft 8, and a winch 17 located in the fourth part of the aircraft 9. In this example, one end of the attachment system is attached to the second part of the aircraft via a frequency damping device 18.

EXAMPLE 8

Figure 8:
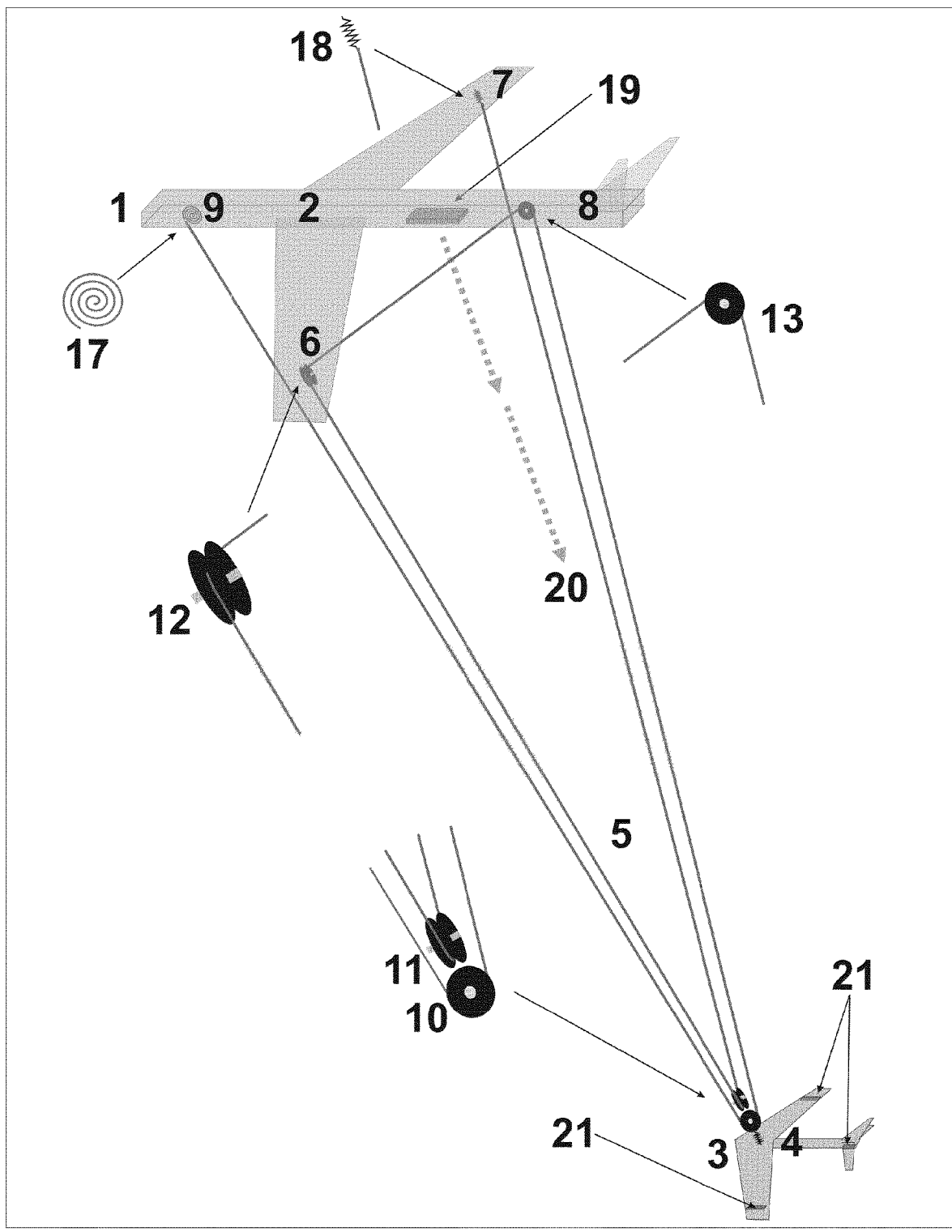
FIG. 8 shows an embodiment of the remote sensing system according to the present invention with four pulleys, a winch, frequency damping unit(s) and reflecting means.

A Remote Sensing System with Four Pulleys, a Winch, Frequency Damping Unit(s) and Reflecting Means FIG. 8 shows an example of an embodiment of the remote sensing system according to the present invention comprising a manned or unmanned aircraft 1 with a positioning unit 2, an air towable housing 3 with one or more sensor(s) 4. In this example, the aircraft 1 comprises a detector 19 configured for detecting the position and altitude of the air towable housing 3 via a light source 20 configured for transmitting an optical signal to the air towable housing 3, which is equipped with reflecting means 21 configured for reflecting the optical signal 20 back to the aircraft 1. In this example, the air towable housing 3 is attached to a first part of the aircraft 6, a second part of the aircraft 7, a third part of the aircraft 8 and a fourth part of the aircraft 9 via the attachment element 5 composed of a single string, wire or rope, and comprising a first pulley 10 attached to the air towable housing 3 via a frequency damping device 18, a second pulley 11 attached to the first pulley 10, a third pulley 12 attached to the first part of the aircraft 6, a fourth pulley 13 attached to the third part of the aircraft 8, and a winch 17 located in the fourth part of the aircraft 9. In this example, one end of the attachment system is attached to the second part of the aircraft via a frequency damping device 18. In this example, the position and attitude of the air towable housing relative to the coordinate frame of the aircraft is measured using the optical signal 20. In this example, it is achieved via one of several possible "remote sensing techniques" from the UAV aircraft and the use of 3 retro-reflective mirrors or retro-reflective tapes placed on top of bird.

EXAMPLE 9

A Remote Sensing System with Two Pulleys

Figure 9:
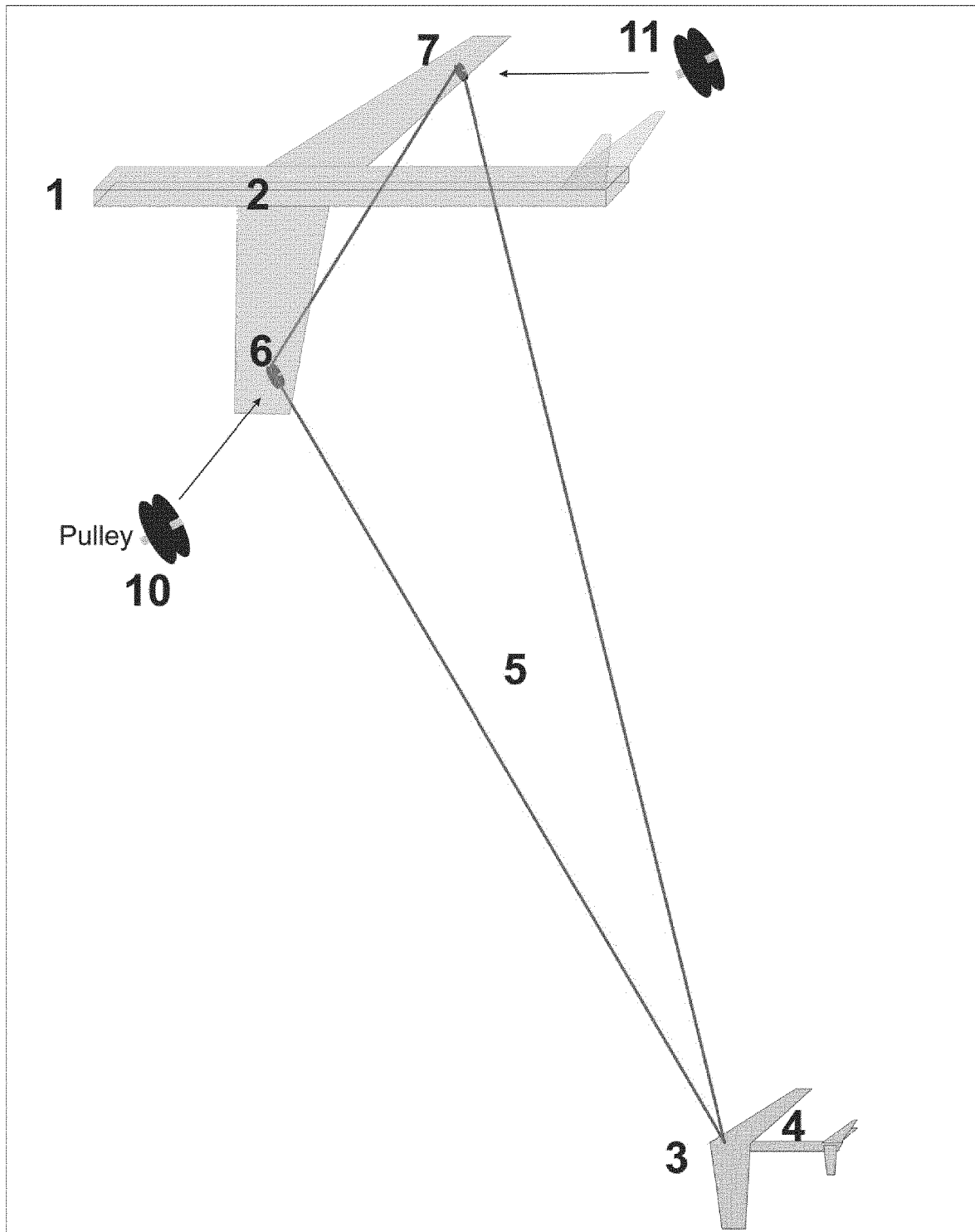
FIG. 9 shows an embodiment of the remote sensing system according to the present invention with two pulleys.

FIG. 9 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6 via a first pulley 10 and a second part of the aircraft 7 via a second pulley 11 via the attachment element 5 composed of a single string, wire or rope attached to the air towable housing.

EXAMPLE 10

A Remote Sensing System with Three Pulleys

Figure 10:
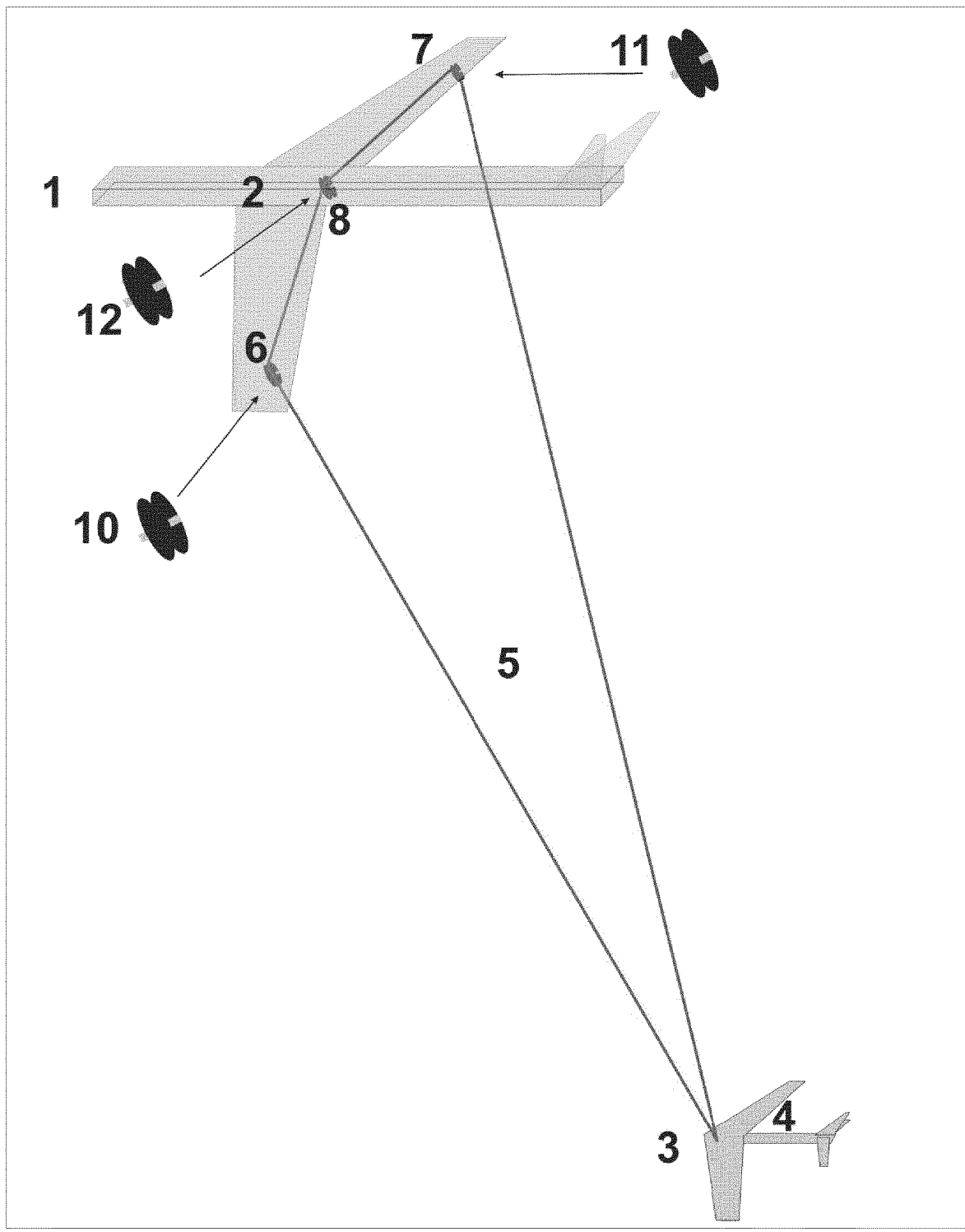
FIG. 10 shows an embodiment of the remote sensing system according to the present invention with three pulleys.

FIG. 10 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6 via a first pulley 10 and a second part of the aircraft 7 via a second pulley 11 and a third part of the aircraft 8 via a third pulley 12 via the attachment element 5 composed of a single string, wire or rope attached to the air towable housing.

EXAMPLE 11

A Remote Sensing System with Three Pulleys

Figure 11:
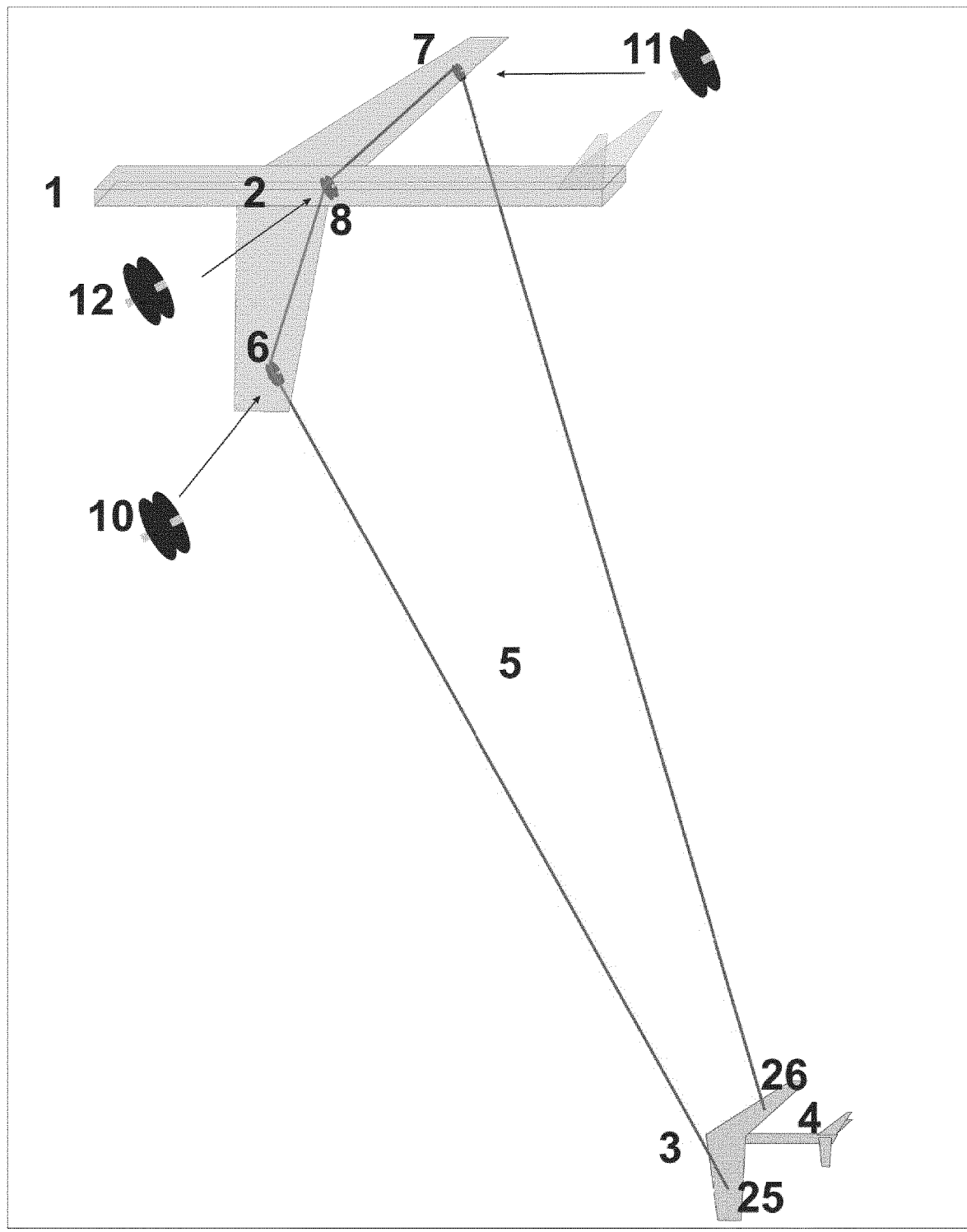
FIG. 11 shows an embodiment of the remote sensing system according to the present invention with three pulleys.

FIG. 11 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6 via a first pulley 10 and a second part of the aircraft 7 via a second pulley 11 and a third part of the aircraft 8 via a third pulley 12 via the attachment element 5 composed of a single string, wire or rope attached to a first part of the air towable housing 25 and a second part of the air towable housing 26.

EXAMPLE 12

A Remote Sensing System with Three Pulleys

Figure 12:
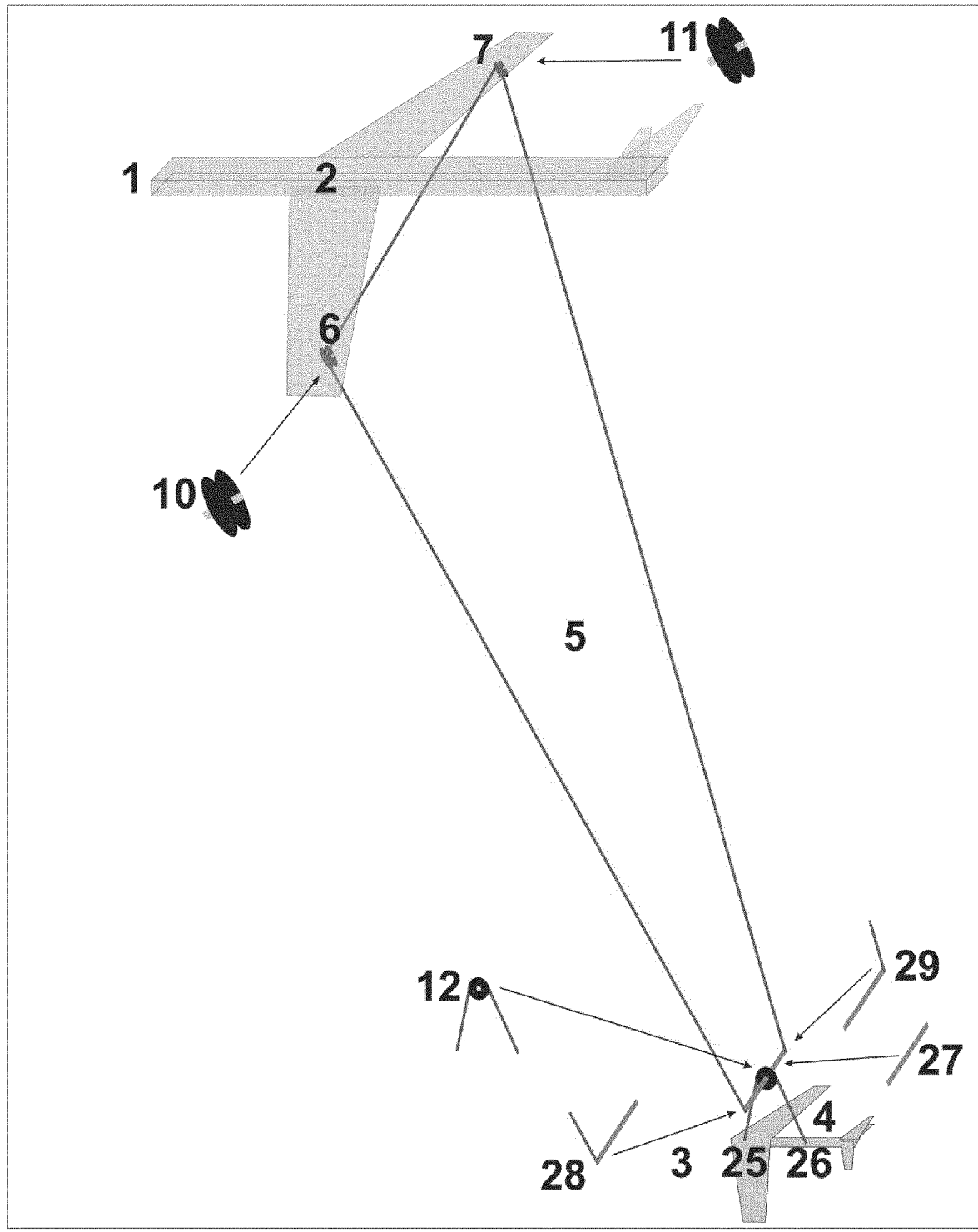
FIG. 12 shows an embodiment of the remote sensing system according to the present invention with three pulleys.

FIG. 12 shows an example of an embodiment of the remote sensing system according to the present invention comprising a manned or unmanned aircraft 1 with a positioning unit 2, an air towable housing 3 with one or more sensor(s) 4, and a bar, rod or beam 27. In this example, the air towable housing 3 is attached to a first part of the aircraft 6 via a first pulley 10 and a second part of the aircraft 7 via a second pulley 11 via the attachment element 5 composed of a single string, wire or rope attached to a first part 28 of the bar, rod or beam 27 and a second part 29 of the bar, rod or beam 27 which is attached to a first part of the air towable housing 25 via a third pulley 12 and a second part of the air towable housing 26 via a third pulley 12.

EXAMPLE 13

A Remote Sensing System with Two Pulleys and Frequency Damping Unit(s)

Figure 13:
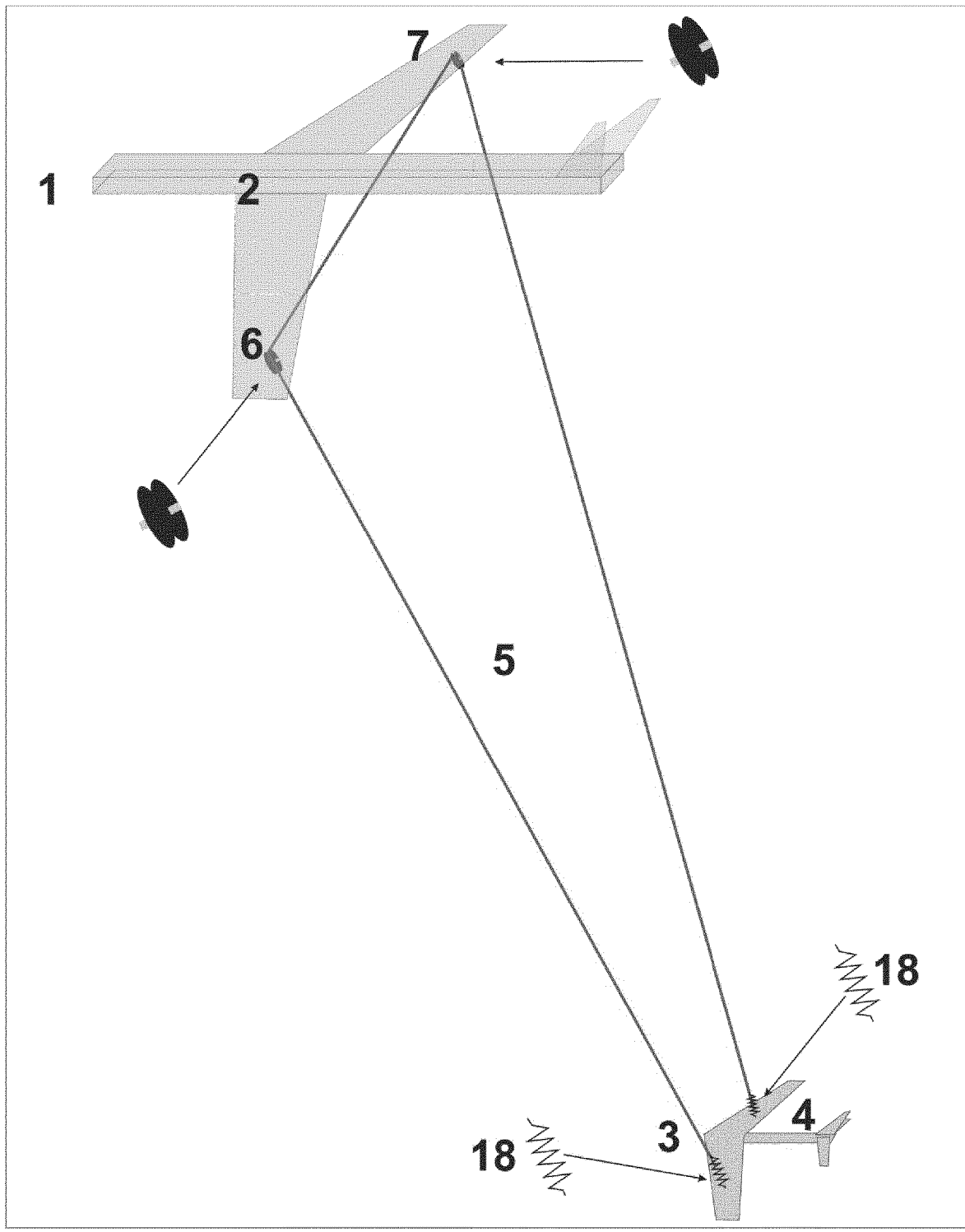
FIG. 13 shows an embodiment of the remote sensing system according to the present invention with two pulleys and frequency damping means.

FIG. 13 shows an example of an embodiment of the remote sensing system according to the present invention comprising a manned or unmanned aircraft 1 with a positioning unit 2, an air towable housing 3 with one or more sensor(s) 4. In this example, the air towable housing 3 is attached to a first part of the aircraft 6 via a first pulley 10 and a second part of the aircraft 7 via a second pulley 11 via the attachment element 5 composed of a single string, wire or rope attached to a first part of the air towable housing via frequency damping device 18 and a second part of the air towable housing via a frequency damping device 18.

EXAMPLE 14

An Air Towable Housing

Figure 14:
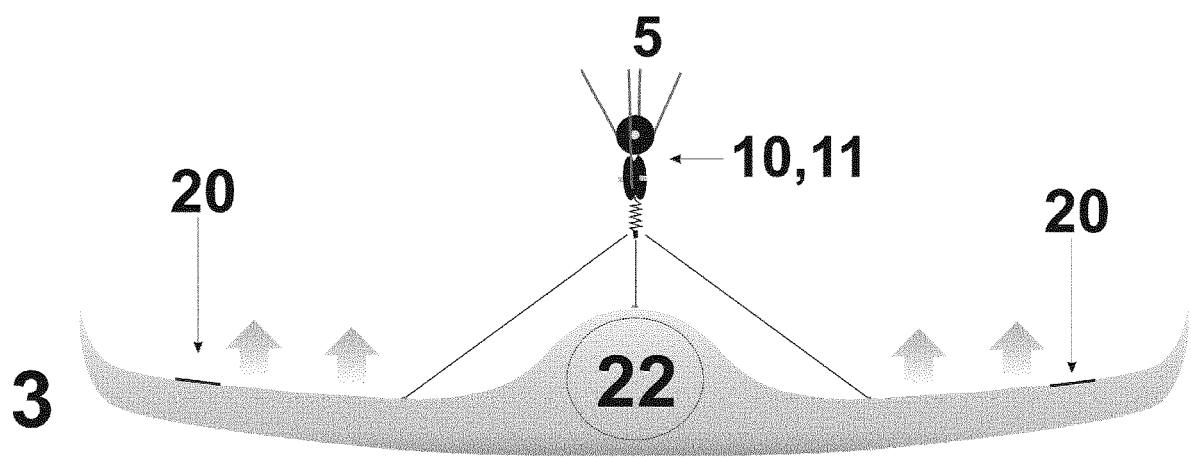
FIG. 14 shows an embodiment of the air towable housing according to the present invention.

FIG. 14 shows an example of a redesigned bird 3 as a combined airfoil and planform. Bird is viewed from the front. In this example, the bird is designed for only a single remote sensing instrument with a first instrument room 22. In this example, the wing span of the air towable housing is around 50 cm. However, the wing span may be more than 50 cm, such as up to 200 cm or more. The wing span may generally be less than 150 cm, such as around 100 cm.

EXAMPLE 15

An Air Towable Housing

Figure 15:
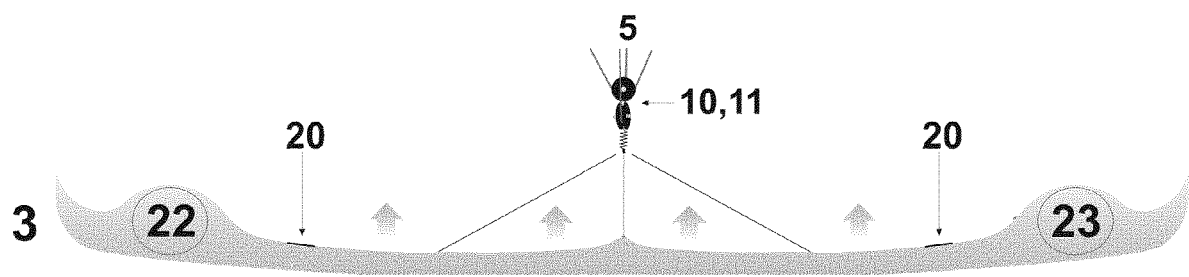
FIG. 15 shows an embodiment of the air towable housing according to the present invention.

FIG. 15 shows an example of a redesigned bird 3 as a combined airfoil and planform. Bird is viewed from the front. In this example, the bird is designed for two remote sensing instruments in a horizontal configuration with a first instrument room 22 and a second instrument room 23. In this example, the wing span of the air towable housing is around 100 cm. The wing span may generally be less than 150 cm, such as around 100 cm, or around 50 cm.

EXAMPLE 16

An Air Towable Housing

Figure 16:
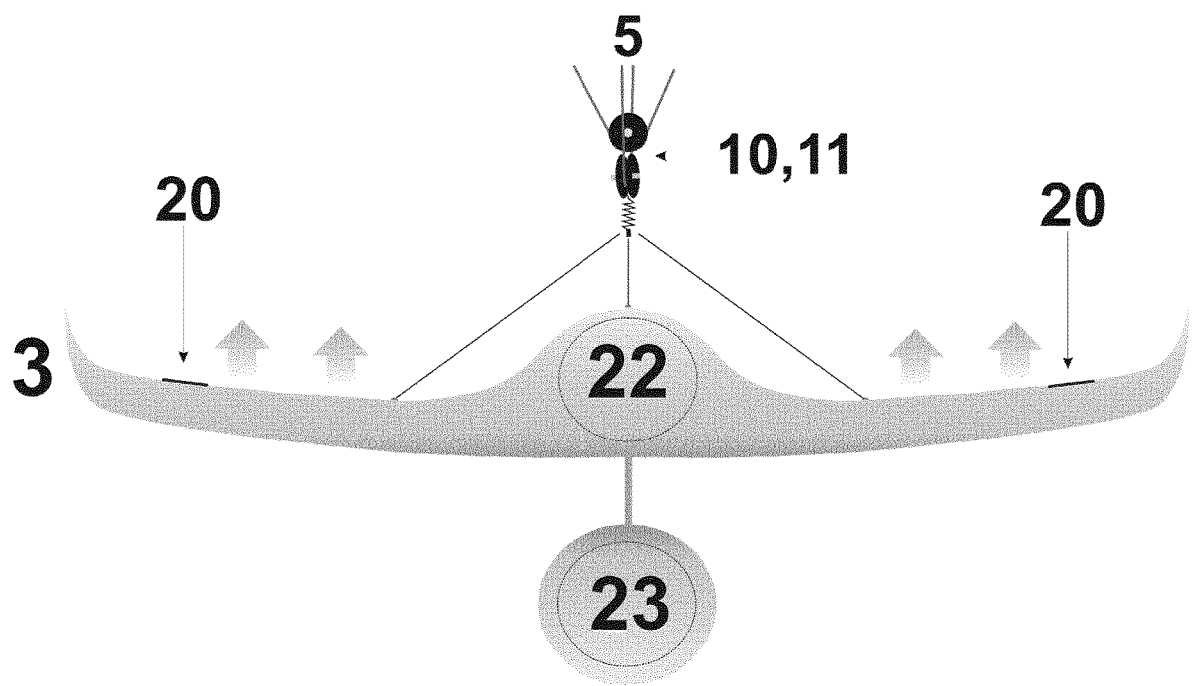
FIG. 16 shows an embodiment of the air towable housing according to the present invention.

FIG. 16 shows an example of a redesigned bird 3 as a combined airfoil and planform. Bird is viewed from the front. In this example, the bird is designed for two remote sensing instruments in a vertical configuration with a first instrument room 22 and a second instrument room 23.

EXAMPLE 17

A Air Towable Housing

Figure 17:
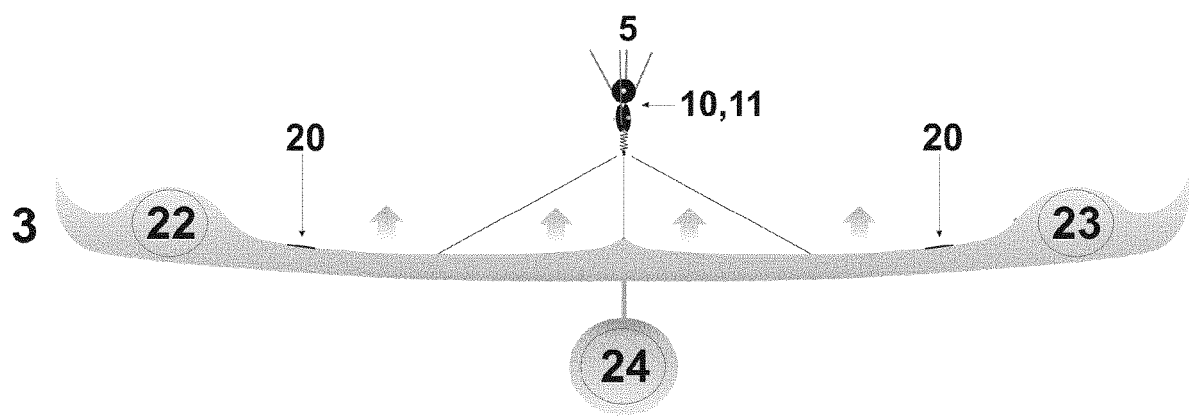
FIG. 17 shows an embodiment of the air towable housing according to the present invention.

FIG. 17 shows an example of a redesigned bird 3 as a combined airfoil and planform. Bird is viewed from the front. In this example, the bird is designed for three remote sensing instruments in a vertical and horizontal configuration with a first instrument room 22, a second instrument room 23 and a third instrument room 24.

EXAMPLE 18

Comparison of Movements of a Bird Below an Aircraft

Figure 18:
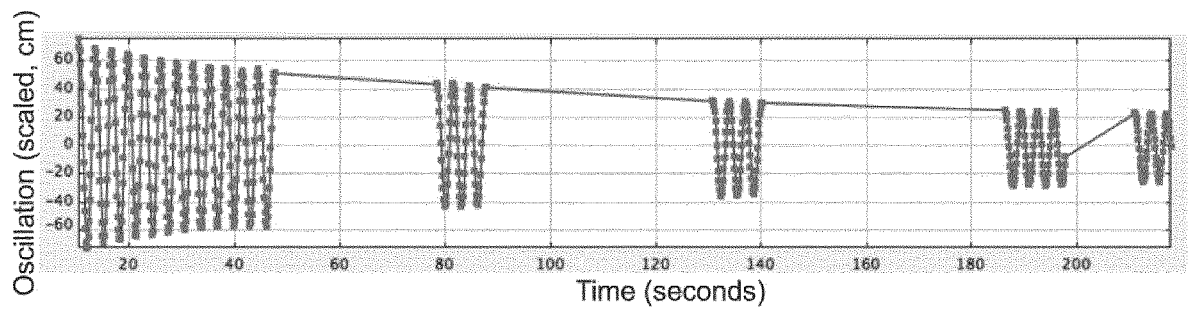
FIG. 18 shows oscillations of a "bird" hanging in a traditional single-string and single-fix point attachment to the aircraft.
Figure 19:
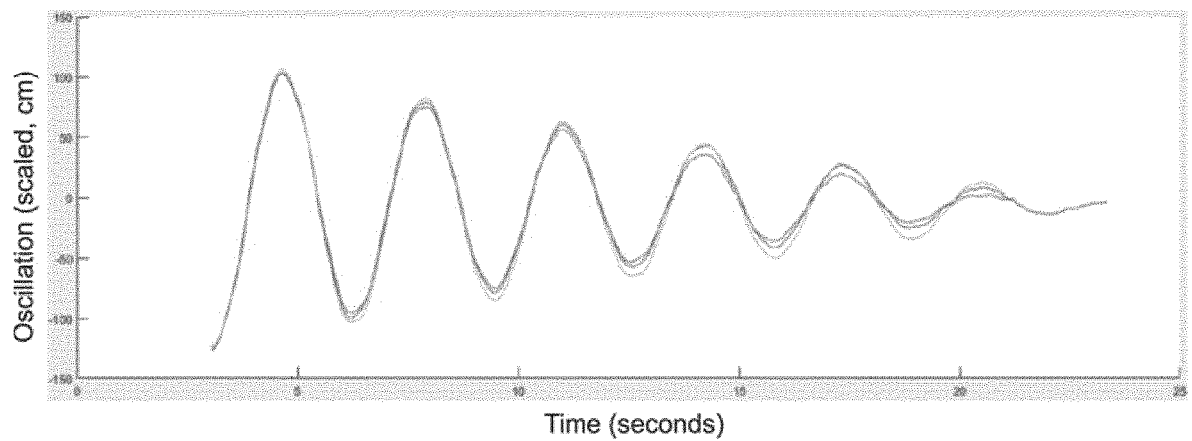
FIG. 19 shows of oscillations of a "bird" in a suspension having at least three attachment places according to the present invention.
Figure 20:
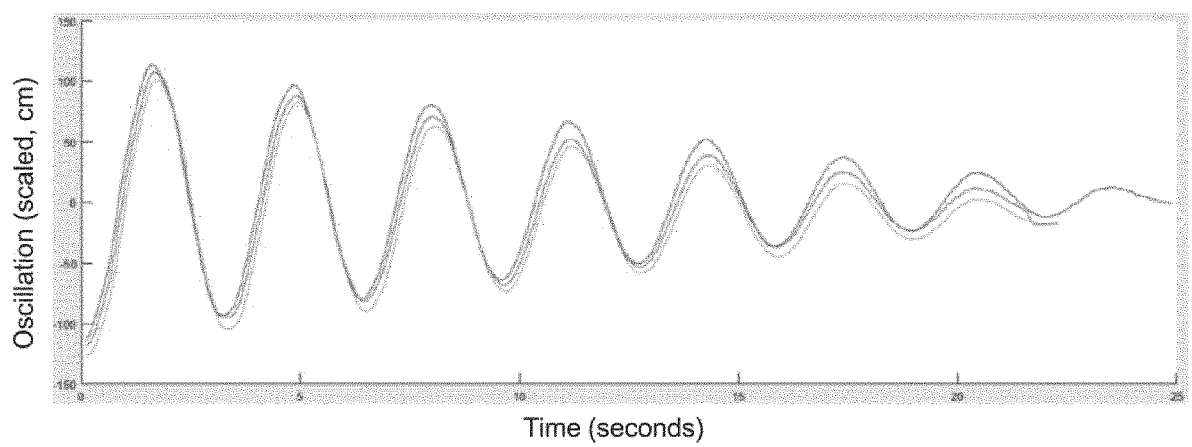
FIG. 20 shows of oscillations of a "bird" in another suspension having at least three attachment places according to the present invention.

FIG. 18-20 shows results based on tests of a traditional system and the system according to the present invention.

FIG. 18 shows oscillations of a "bird" hanging in a traditional single-string and single-fix point attachment to the aircraft. This figure is for comparative reasons, and shows the current state-of-the-art. As can be seen from FIG. 1, the bird is highly unstable and continues to sway back and forth long after an initial acceleration. The result is experimentally found, and demonstrates that the bird in a traditional single string and single-fix point attachment to the aircraft continues to sway back and forth over long time (>200 seconds). The red dots show the mapping of the movement of the air towable housing. Black lines in between are periods when the movement is not monitored.

FIG. 19 shows oscillations of a "bird" in a suspension having at least three attachment places according to the present invention. The actual attachment setup is identical to the one shown in FIG. 1, where the pulley is connected to the air towable housing, and the attachment element is connected to two separate places on the aircraft. As compared to the traditional setup (FIG. 18), the swaying of the air towable housing after an initial acceleration is markedly reduced with differential movements (oscillation), disappearing by damping within ~25 seconds.

FIG. 20 shows oscillations of a "bird" in a suspension having at least three attachment places according to the present invention. The actual attachment setup is identical to the one shown in FIG. 9, where the attachment element is connected to the aircraft at two separate places on the aircraft via two pulleys on these separate places. The attachment element is further connected to the air towable housing at one place. As compared to the traditional setup (FIG. 18), the swaying of the air towable housing after an initial acceleration is markedly reduced with differential movements (oscillation), disappearing by damping within ~25 seconds. The setup as similar to FIG. 9 further reduces high-frequency vibrations between the aircraft and the air towable housing because differential movements are shared between the first and the second pulley below the aircraft rather than a first pulley near the air towable housing as is the case for FIG. 1.

The tests of the present invention demonstrates that the attachment element comprising a single string, wire or rope which is attached to the air towable housing and to the first and seconds place of the aircraft via pulley(s) markedly reduces instability of the air towable housing during accelerations. Swaying time was reduced from >200 seconds to less than 25 seconds.

EXAMPLE 19

The Effect of the at Least One Pulley and the Attachment Element

Figure 21:
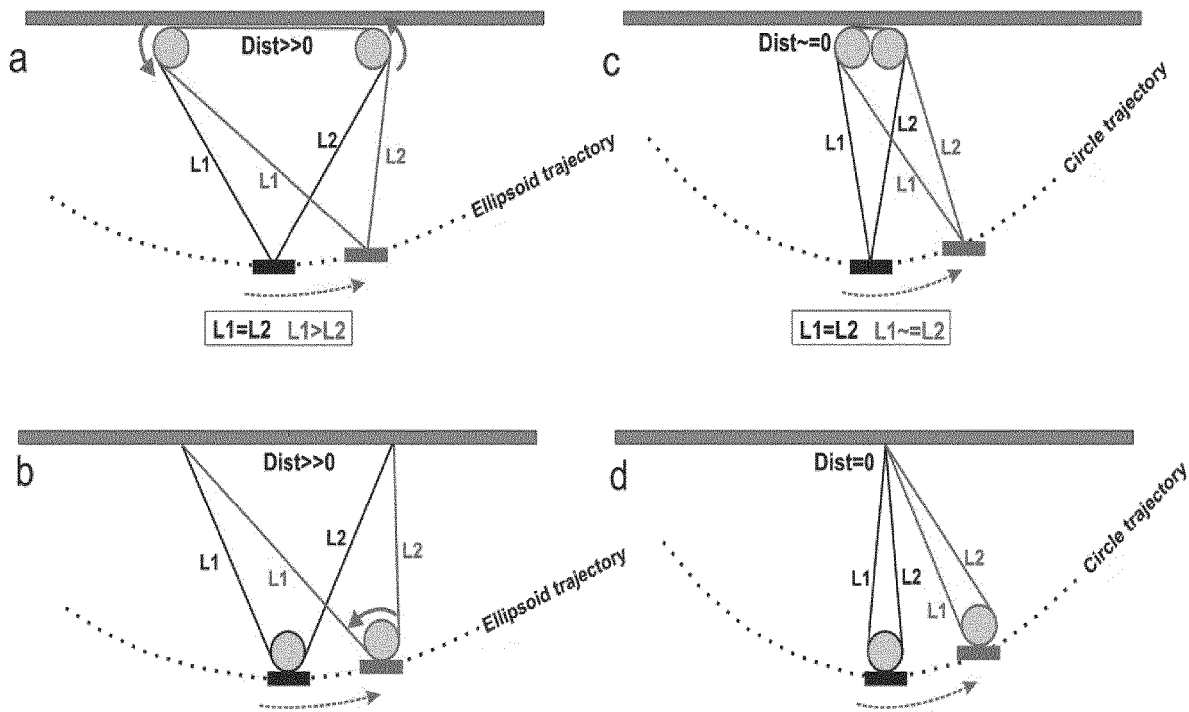
FIG. 21 shows the effect of the at least one pulley and the attachment element.

FIG. 21 (*a*) shows a system according to the present invention with two pulleys attached at two different places of the aircraft and an attachment element at one place of the air towable housing. In this system, swaying of the air towable housing will increase the length L1 of the left side of the attachment element and decrease the right side length L2. This will create angular spin within the pulleys to maintain a stretched system. Accordingly, the friction within the pulleys will dampen the swaying in short time.

FIG. 21(*b*) shows a system according to the present invention with one pulley attached at a single place of the air towable housing and the attachment element attached at two different places of the aircraft. In this system, swaying of the air towable housing will also increase L1 relative to L2 and induce angular spin within the pulley to maintain a stretched system. The friction within the pulleys will dampen the swaying in short time.

The combined use of pulley(s), a single attachment element string (a string, wire or rope), and at least two and different fix-points of the attachment element at the aircraft (for example at each wing tip) ensure that differential movements of the air towable housing (for example a horizontal swaying) will be accommodated by an increase in length (L1) of one side of the attachment element and a decrease in length L2 of the other side by a similar amount. This interdependent dynamic behavior of the suspension is only feasible due to the use of pulley(s) and the attachment element.

The lengths of the attachment (L1 and L2) on either side of the pulley(s) will only change during a differential movement of the air towable housing if a certain distance is assured between the attachment points of the string at the aircraft. The resulting changes in lengths across the pulley(s) will enforce work on the pulley(s) i.e. angular spin to maintain the string on each side completely stretched. This angular spin of the pulley(s) produces internal friction within the pulley(s), for example within the ball bearings of the pulleys(s), which will dampen the swaying of the air towable housing. The above is illustrated in systems with two pulleys at the aircraft (FIG. 21(*a*)) and one pulley at the air towable housing (FIG. 21(*b*)).

The distance between the fix-points at the aircraft will ensure the swaying of the air towable housing to follow an ellipsoid trajectory rather than a circular trajectory as obtained for a traditional setup. Further, the ellipsoid trajectory will ensure the air towable housing to stay closer to ground even when swaying, which is a key objective for most purposes within remote sensing. The present invention therefore also provides for an even more optimized remote sensing system.

FIG. 21(*c-d*) show systems which are not part of this invention. The systems are included for comparison with the present invention. In FIG. 21(*c-d*), sideways movement of the air towable housing relative to the aircraft follows a circular trajectory. The circular trajectory is not responsible for introducing rotation of the at least one pulley. The systems in FIG. 21(*c-d*) do therefore not induce angular spin within the pulleys. Hence, in these systems, swaying continues. Stated differently, the connection places of the attachment element at the aircraft are so close, so they do not induce angular spin within the pulleys. Accordingly, swaying of the housing does not increase the length L1 relative to L2, and it will therefore not induce angular spin within the pulleys. Hence, in these systems, swaying continues. When the air towable housing moves from side to side, the lengths (L1 and L2) of the two different parts of the attachment element do not change significantly. Hence, no work is done on the pulley(s) and therefore no internal friction of the pulley(s) will cause damping of the swaying.

Finally, since the air towable housing follows a circular trajectory rather than an ellipsoid trajectory, the air towable housing will during swaying move further away from ground than if it followed an ellipsoid trajectory. For remote sensing purposes (for example magnetic measurements conducted by sensors within the air towable housing), it is vital to stay close to ground at all times, and the systems in FIG. 21(c-d) do not.

The invention claimed is:

1. A remote sensing system, comprising:
an air towable housing configured for carrying at least one sensor configured for executing measurements of the remote sensing system,
an aircraft configured for towing the air towable housing; and
an attachment element connecting the air towable housing to the aircraft via at least a first pulley, the attachment element being attached in a suspension having at least three attachment places:
a first attachment place is located on the housing,
a second attachment place is located on a first place of the aircraft, and
a third attachment place is located on a second place of the aircraft,
wherein the at least first pulley is attached to the first attachment place, or the at least first pulley is attached to the second attachment place and a second pulley is attached to the third attachment place;
wherein the second attachment place and the third attachment place are spaced on the aircraft along an horizontal direction perpendicular to a motion direction of the aircraft when towing the housing and located on opposite sides of the aircraft with respect to said motion direction of the aircraft;
wherein the suspension by the at least three attachment places of the suspension connects the air towable housing to the aircraft, such that movement of the air towable housing relative to the aircraft along said horizontal direction enforces rotation of the at least one pulley, and wherein the pulley(s) are mounted on bearings which are configured for producing internal friction when each pulley is rotated, said produced friction being configured for dampening the movement along said horizontal direction.

2. The remote sensing system according to claim 1, wherein the aircraft is a manned or unmanned aircraft comprising a positioning unit configured for providing a set of coordinates defining a position and/or altitude of the aircraft.

3. The remote sensing system according to claim 1, wherein the air towable housing is non-magnetic.

4. The remote sensing system according to claim 1, a third pulley is attached to a third of the at least three attachment places.

5. The remote sensing system according to claim 1, wherein an additional pulley is attached to the first pulley, and/or the second pulley and/or a third pulley.

6. The remote sensing system according to claim 1, wherein the attachment element is further attached to a third and/or fourth place of the aircraft.

7. The remote sensing system according to claim 1, wherein the aircraft comprises a winch configured for controlling a length of the attachment element, thereby controlling a position and/or an altitude of the air towed housing relative to the aircraft.

8. The remote sensing system according to claim 1, wherein one of the at least three attachment places is connected with a frequency damping device.

9. The remote sensing system according to claim 8, wherein the frequency damping device is a spring or an elastic element.

10. The remote sensing system according to claim 1, wherein the aircraft comprises a detector configured for detecting a position and/or altitude of the air towable housing.

11. The remote sensing system according to claim 1, wherein a set of coordinates, defining a position and/or the altitude of the aircraft is linked to a position and/or altitude of the air towable housing.

12. The remote sensing system according to claim 11, wherein the aircraft comprises a light source configured for transmitting an optical signal to the air towable housing, the air towable housing comprises at least one reflecting element configured for reflecting the optical signal back to the aircraft, the optical signal is detected by a detector, and the position and/or the altitude of the aircraft is linked to the position and/or altitude of the air towable housing.

13. The remote sensing system according to claim 1, wherein the air towable housing comprises an aerofoil configured for providing positive or negative lift to the air towable housing.

14. The remote sensing system according to claim 1, wherein the attachment element is a string, a rope, or a wire.

15. The remote sensing system according to claim 1, wherein the first place of the aircraft is a tip of the aircraft, a first wing of the aircraft, or a first boom extending from the aircraft and the second place of the aircraft is a rear of the aircraft, a second wing of the aircraft, or a second boom extending from the aircraft.

16. The remote sensing system according to claim 6, wherein the third place of the aircraft is a first wing or a first boom extending from the aircraft and/or the fourth place of the aircraft is a second wing or a second boom extending from the aircraft.

17. The remote sensing system according to claim 5, wherein the additional pulley is attached perpendicular to the first pulley and/or the second pulley and/or the third pulley.

18. The remote sensing system according to claim 1, wherein the aircraft is a helicopter, a multirotor, a fixed wing airplane, a hybrid multirotor or a fixed wing aerial vehicle.

19. The remote sensing system according to claim 1, wherein the at least one sensor is configured for acquiring data in a form of geomagnetic data, image data, and/or differential data.

20. The remote sensing system according to claim 1, wherein the system is configured for acquiring a position and/or altitude of the aircraft towing the air towable housing, and for determining a position and/or altitude of the air towable housing relative to the aircraft.

21. A remote sensing system, comprising:
an air towable housing configured for carrying at least one sensor for executing measurements of the remote sensing system, the air towable housing comprising a first attachment place disposed on an upper surface of the air towable housing;

an aircraft configured to tow the air towable housing, the aircraft having a longitudinal axis and a motion direction when towing the housing, the aircraft comprising:
- a second attachment place disposed on a lower surface of the aircraft; and
- a third attachment place disposed on the lower surface of the aircraft, the second and third attachment places being laterally spaced apart and disposed on opposed sides of the longitudinal axis along a horizontal axis perpendicular to the motion direction of the aircraft; and an attachment element coupling the air towable housing to the aircraft in suspension via one or more pulleys, the attachment element:
- extending directly from the second attachment place to the first attachment place; and
- extending directly from the first attachment place to the third attachment place, wherein translation of the air towable housing relative to the aircraft along the horizontal axis results in a rotation of at least a first pulley of the one or more pulleys.

22. The remote sensing system of claim 21, wherein the first pulley is coupled to the first attachment place.

23. The remote sensing system of claim 21, wherein:
the first pulley is coupled to the second attachment plate; and
a second pulley of the one or more pulleys is coupled to the third attachment place.

\* \* \* \* \*